United States Patent
Myeong et al.

(10) Patent No.: US 7,933,686 B2
(45) Date of Patent: Apr. 26, 2011

(54) METHOD OF DIVIDING COVERAGE AREA FOR ROBOT AND DEVICE THEREOF

(75) Inventors: Hyeon Myeong, Yongin-si (KR);
Seok-won Bang, Yongin-si (KR);
Jung-won Kang, Yongin-si (KR);
Si-jong Kim, Yongin-si (KR);
Myung-Jin Chung, Yongin-si (KR);
Su-jinn Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1097 days.

(21) Appl. No.: 11/706,215

(22) Filed: Feb. 15, 2007

(65) Prior Publication Data
US 2008/0046125 A1    Feb. 21, 2008

(30) Foreign Application Priority Data
Aug. 18, 2006   (KR) .................. 10-2006-0078398

(51) Int. Cl.
*G05B 19/04* (2006.01)
*G05B 19/4061* (2006.01)

(52) U.S. Cl. ....... 700/253; 700/255; 700/259; 340/5.71; 382/103; 701/209

(58) Field of Classification Search .......... 700/250–253; 318/568.05
See application file for complete search history.

(56) References Cited

U.S. PATENT DOCUMENTS

| 6,751,535 B2* | 6/2004 | Mori .............................. 701/23 |
| 2005/0159879 A1* | 7/2005 | De Graeve et al. ........... 701/200 |
| 2006/0025888 A1* | 2/2006 | Gutmann et al. ............. 700/245 |
| 2006/0064202 A1* | 3/2006 | Gutmann et al. ............. 700/245 |
| 2007/0156286 A1* | 7/2007 | Yamauchi ..................... 700/245 |
| 2007/0293985 A1* | 12/2007 | Myeong et al. ............... 700/245 |

FOREIGN PATENT DOCUMENTS

| JP | 63-265312 | 11/1988 |
| JP | 09-212238 | 8/1997 |
| JP | 10-260724 | 9/1998 |
| JP | 2003-269937 | 9/2003 |

(Continued)

OTHER PUBLICATIONS

Choset H, Acar E, Rizzi A and Luntz J; "Exact Cellular Decompositions in Terms of Critical Points of Morse Functions"; Proc IEEE ICRA'00, San Francisco Ca 2000.*

(Continued)

*Primary Examiner* — Thomas G Black
*Assistant Examiner* — Lin B Olsen
(74) *Attorney, Agent, or Firm* — Staas & Halsey LLP

(57) ABSTRACT

A method of dividing a coverage area of a robot and a device for the same. That is, a method of producing a space map for a robot to work and dividing the space map into at least one segment and a device for the same. The method includes producing an occupancy grid map composed of grid points that are probabilistically distributed by sensing a distance from an obstacle, producing a configuration space map by increasing the thickness of an obstacle and a wall in the occupancy grid map on the basis of the radius and size of the robot, and dividing an area by sweeping the area with a band-typed slice in the configuration space map.

21 Claims, 16 Drawing Sheets

FOREIGN PATENT DOCUMENTS

| JP | 2005-032196 | 2/2005 |
|---|---|---|
| JP | 2005-332204 | 12/2005 |
| KR | 10-2005-0024840 | 3/2005 |
| KR | 10-2006-0014715 | 2/2006 |

OTHER PUBLICATIONS

Huang W; "Optimal Line-sweep-based Decompositions for Coverage Algorithms"; Proc of 2001 IEEE Int. Conf. on Robotics and Automation.*

Kwon Y and Lee J; "An Obstacle Avoidance Algorithm for Mobile Robot: The Improved Weighted Safety Vector Field Method"; Intelligent Control 1995, Proc IEEE Int Symp pp. 441-446.*

Wise K and Bowyer A; "A Survey of Global Configuration=Space Mapping Techniques for a Single Robot in a Static Environment"; Int Journal of Robotics Research, 2000, pp. 762-779.*

Wong S.; "Qualitative Topological Coverage of Unknown Environments by Mobile Robots", Doctoral Thesis, Dept of Electrical and Computer Eng, Univ. of Auckland, New Zealand, Feb. 2006, pp. 10-34.*

Yao Z.; "Finding Efficient Robot Path for the Complete Coverage of a Known Space",,Proc of 2006 IEEE-IRJ Conf. on Intelligent Robots and Sysstems, Oct. 2006; pp. 3369-3374.*

Zhang H-B, Yuan K, Mei S-Q and Zhou-Q-R; "Visual Navigation of an Automated Guided Vehicle Based on Path Recognition"; Proc 3rd Int. Conf. on Machine Learning and Cybernetics, Aug. 2004; pp. 3877-3881.*

Hai-bo Zhang, et al., "Visual Navigation of a Mobile Robot Based on Path Recognition", Jul. 24, 2001.

Chinese Office Action issued Apr. 27, 2010 in corresponding Chinese Patent Application 200710102207.X.

Jung Won Kang et al., "Complete & Time-Efficient Coverage Path Planning for a Mobile Robot in Dynamic Environments", *Proceedings of the 4$^{th}$ International Symposium on Mechatronics and its Applications (ISM07)*, Sharjah, U.A.E., Mar. 26-29, 2007.

Chinese Journal Of Mechanical Engineering, vol. 40, No. 10 dated Oct. 2004 (6 pgs).

Chinese Office Action for corresponding Chinese Patent Application No. 200710102207X dated Nov. 6, 2009 (7 pgs).

* cited by examiner

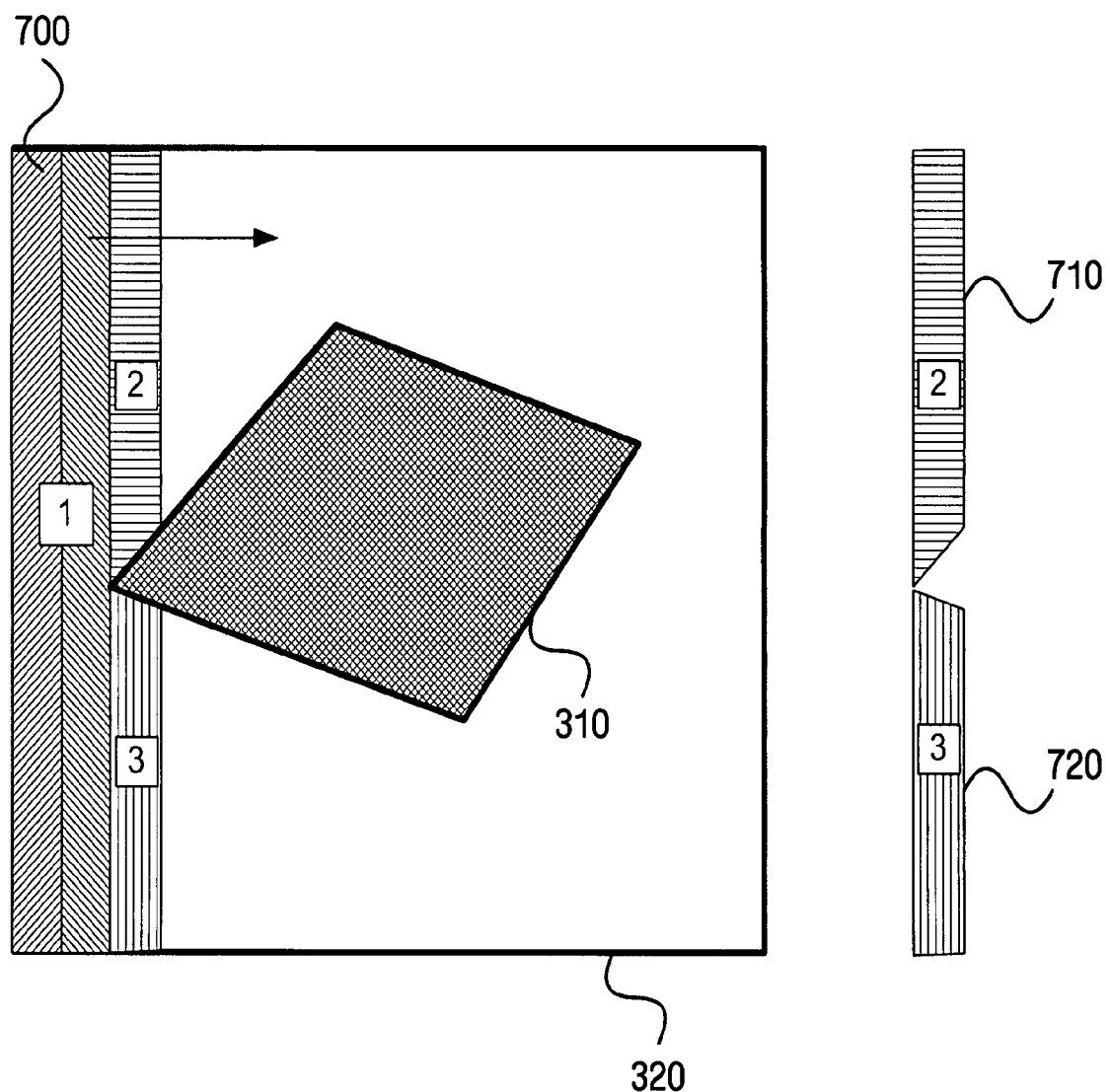

10-1

10-2

METHOD OF DIVIDING COVERAGE AREA FOR ROBOT AND DEVICE THEREOF

CROSS-REFERENCE TO RELATED APPLICATIONS

This application claims priority from Korean Patent Application No. 10-2006-0078398 filed on Aug. 18, 2006 in the Korean Intellectual Property Office, the disclosure of which is incorporated herein by reference in its entirety.

BACKGROUND OF THE INVENTION

1. Field of the Invention

The present invention relates to a method of dividing a coverage area for a robot and a device of the same. More particularly, to a method of producing a space map for a robot to work and dividing the space map into at least one segment and a device of the same.

2. Description of the Related Art

Conventional robots have been designed for automatic processes in factories or industries. As an automatic control technology and remote control technology have been developed, robots have been used for simple work or work under extreme environments, such as high or low temperature, or in dangerous environments such as the outer space or the sea floor.

In addition to industrial robots for industries, robots for housework or business assistance at homes and offices have been put to practical use. For example, typical robots are a cleaning robot, a guiding robot, and an anti-crime robot etc.

Such conventional robots can perform specific jobs in a predetermined area. However, when an intended region is large, if the robots randomly travel or work at random place in the area, they cannot effectively perform specific jobs for the whole area. Accordingly, it has been tried to effectively divide an area within a given space and perform specific jobs for the divided area to improve efficiency.

FIG. 1 is a view schematically showing a conventional method of dividing an area.

In the conventional method as shown in FIG. 1, an area was divided by scanning a given area with a straight line, i.e. sweep line 100. As shown in FIG. 1, an area may be divided at a point where the sweep line 100 meets a critical point 150. The critical point 150 is where the sweep line meets an obstacle and no obstacles exist in the upper and lower portions. Accordingly, in FIG. 1, two critical points 150 are created, which makes four segments.

However, as for a grid map that is recognized by a robot with a distance measuring sensor, the outlines of obstacles or walls may not be smooth and considerably uneven. For example, as shown in FIG. 1, a plurality of curves or recesses appear at the left and right sides and causes several unnecessary critical points 160 in scanning with a sweep line 100, which creates unnecessary segments in dividing the area.

Considering the above-mentioned problems, a conventional method of smoothing the outline of a grid map and dividing the area in consideration of unnecessary critical points in dividing is used.

However, according to the conventional method of smoothing the outline of a grid map, the grid map is produced by measuring distances with a sensor mounted in a robot. Therefore, because the robot may always variably travel within tolerances for the sensor and it is difficult to determine the exact location of the robot and errors in relative distances from walls and obstacles may be created accordingly. For this reason, the method has a limit to making a smooth grid map.

SUMMARY OF THE INVENTION

Accordingly, it is an aspect of the present invention to provide a configuration space map and divide an area by scanning the configuration space map with a band-typed slice.

It is another aspect of the present invention to provide an area where a robot can effectively work by removing noise cells and combining unnecessarily divided segments.

Additional aspects and/or advantages of the invention will be set forth in part in the description which follows and, in part, will be apparent from the description, or may be learned by practice of the invention.

These and/or other aspects of the present invention are achieved by providing a method of dividing a coverage area for robot, the method including producing an occupancy grid map including grid points which are probabilistically distributed by sensing a distance from an obstacle, producing a configuration space map by increasing the thickness of an obstacle and a wall in the occupancy grid map based on a radius and a size of the robot, and dividing an area by sweeping the area with a band-typed slice in the configuration space map.

It is another aspect of the present invention to provide a device for dividing a coverage area for a robot, the device including an occupancy grid map-producing unit to produce an occupancy grid map including grid points which are probabilistically distributed by sensing a distance from an obstacle, a configuration space map-producing unit to produce a configuration space map by increasing a thickness of an obstacle and a wall in the occupancy grid map based on a radius and a size of the robot, and a dividing unit to divide an area by sweeping the area in a predetermined direction with a band-typed slice in the configuration space map.

BRIEF DESCRIPTION OF THE DRAWINGS

These and/or other aspects and advantages of the invention will become apparent and more readily appreciated from the following description of the embodiments taken in conjunction with the accompanying drawings in which:

FIG. 7A is a view illustrating a method of applying a band-typed slice to the configuration space map, according to an embodiment of the present invention.

DETAILED DESCRIPTION OF THE PREFERRED EMBODIMENTS

The present invention may, however, be embodied in many different forms and should not be construed as being limited to the embodiments set forth herein. Rather, these embodiments are provided so that this disclosure will be thorough and complete and will fully convey the concept of the invention to those skilled in the art.

Figure 2:
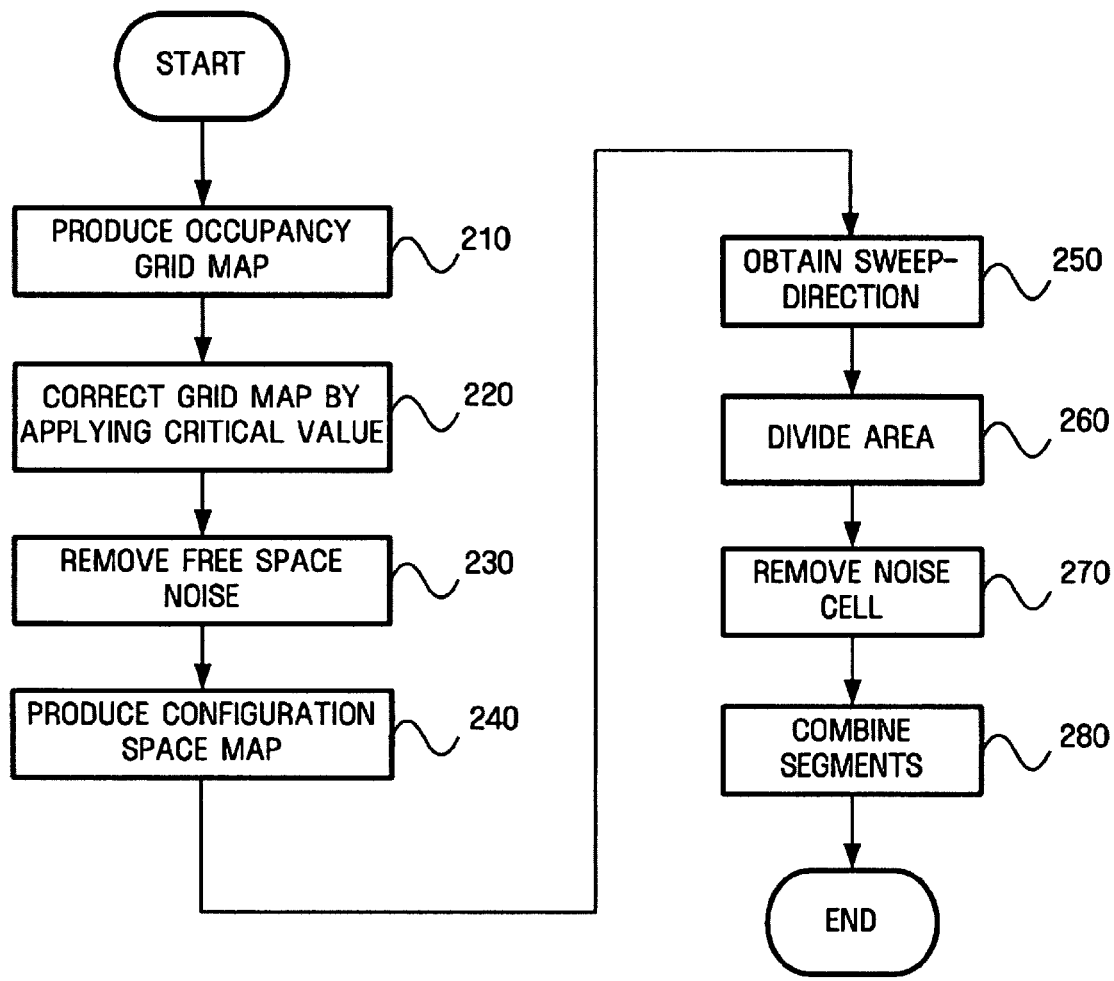
FIG. 2 is a flowchart illustrating a method of dividing a coverage area for a robot according to an embodiment of the present invention.

FIG. 2 is a flowchart illustrating a method of dividing a coverage area for a mobile robot according to an embodiment of the present invention.

The method of dividing a coverage area for a mobile robot according to an embodiment of the present invention includes producing an occupancy grid map at operation 210, correcting the grid map by applying a critical value at operation 220, removing noises in free space at operation 230, producing a configuration space map at operation 240, obtaining a sweep direction at operation 250, dividing an area at operation 260, removing cell noises at operation 270, and combining segments at operation 280.

Before dividing an area, a map of the area should be produced. According to an embodiment of the present invention, a robot produces a map for space to work using location and distance information while traveling by self-remote.

Figure 3:
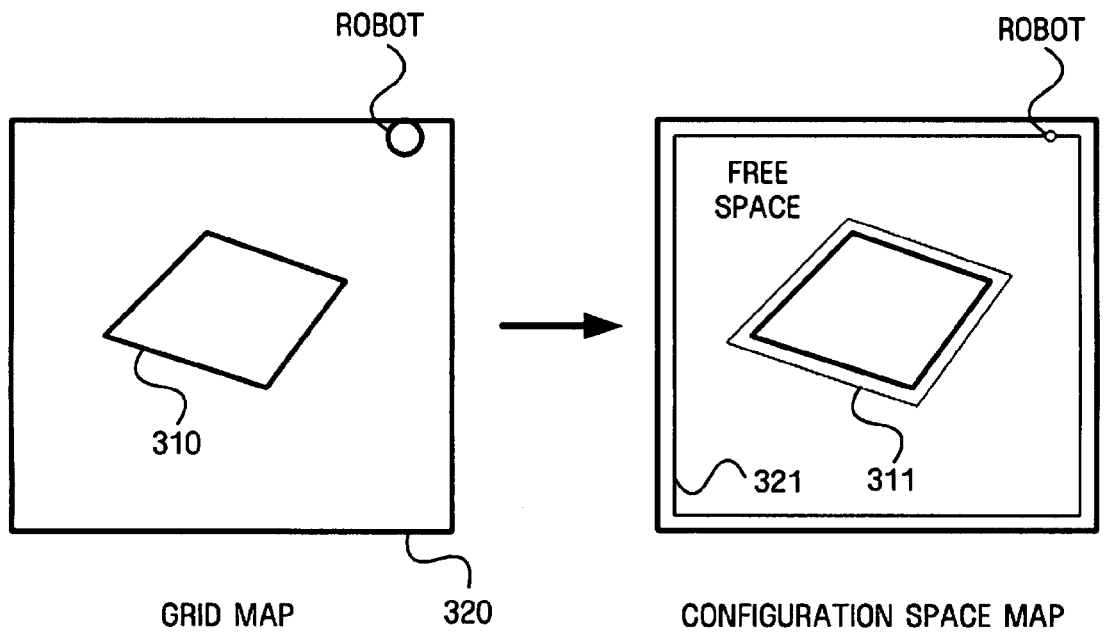
FIG. 3 is a view illustrating a concept of a configuration space map, according to an embodiment of the present invention.

FIG. 3 is a view illustrating a concept of a configuration space map, according to an embodiment of the present invention.

Conventional grid maps show obstacles and walls or free space in a predetermined area. These grid maps are produced without considering the size of a robot, which may cause the robot to collide with the walls or obstacles while traveling or to excessively move forward or backward. According to an embodiment of the present invention, as shown in a view at the right side of FIG. 3, a robot is reduced as a point size and the free space 311 and 321 created in consideration of the relative sizes of walls 320 and obstacles 310 to the size of the robot may be produced by defining a configuration space map considering the size of the robot. It may be possible to generate a traveling path or divide a work area of the robot without considering the size of the robot by producing the configuration space map.

Thus, a robot produces an occupancy grid map by recognizing surrounding obstacles, traveling by self-remote in operation 210. The occupancy grid map allows a robot to probabilistically recognize obstacles or walls by sensing distances with at least one sensor mounted. According to an embodiment of the present invention, a probability value between 0 and 1 is given for the location and existence of obstacles because the sensor may cause errors in accuracy and location due to the traveling of the robot. For convenience in this embodiment of the present invention, when a plurality of grid points representing obstacles and walls are given as probability values, they are defined as probability grid points. That is, 0 is given as free space and 1 is given to an obstacle with 100% probability, so that a value between 0 and 1 implies that an obstacle probably exists. Real environment includes only one of obstacle(1) and free space(0), but a map also comprises values between 0 and 1, because a locational error of obstacles is created by an error in sensing distances of the sensor or an error in recognizing the location of the robot itself.

Figure 4A:
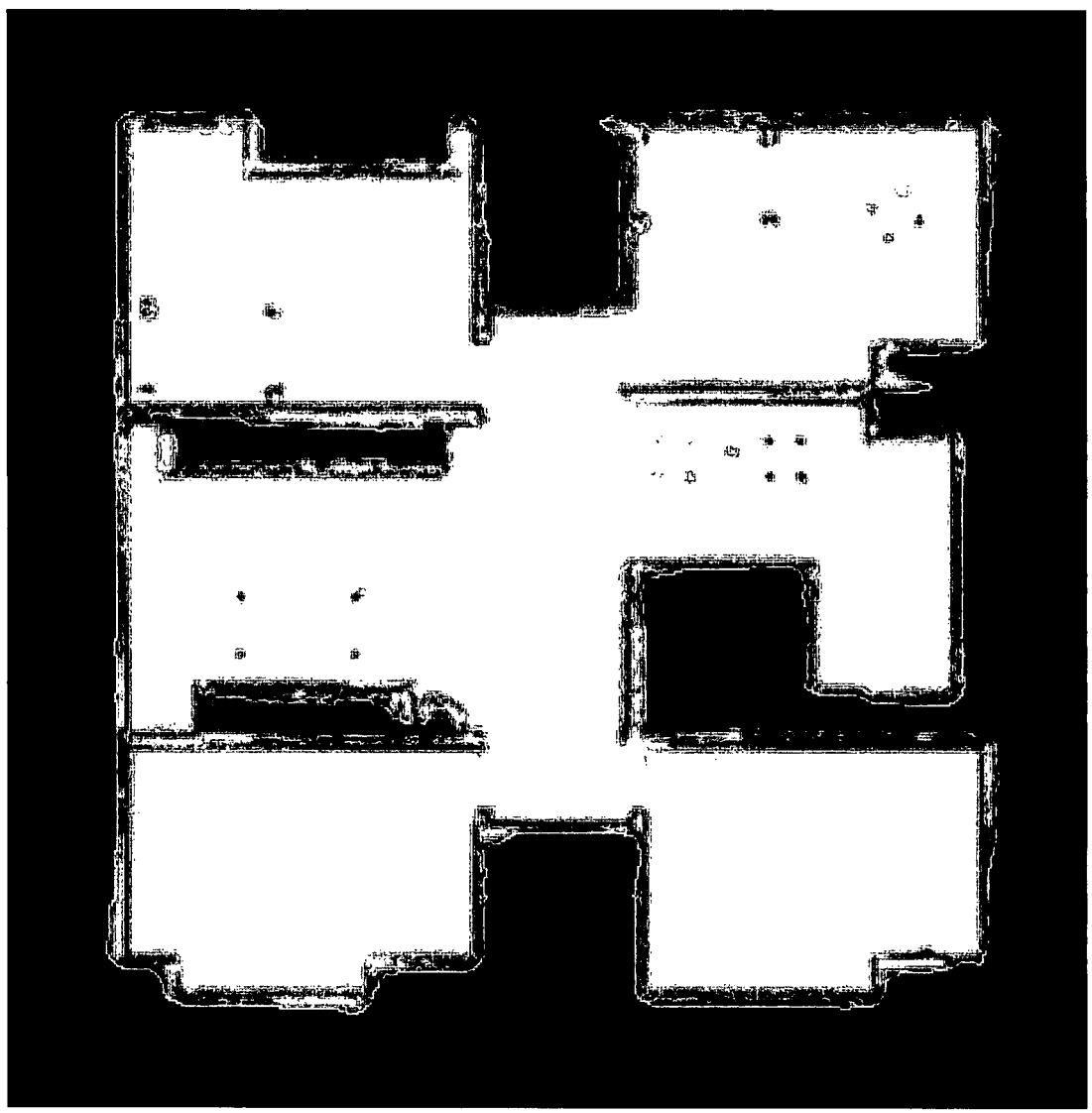
FIG. 4A is an occupancy grid map according to an embodiment of the present invention.
Figure 4B:
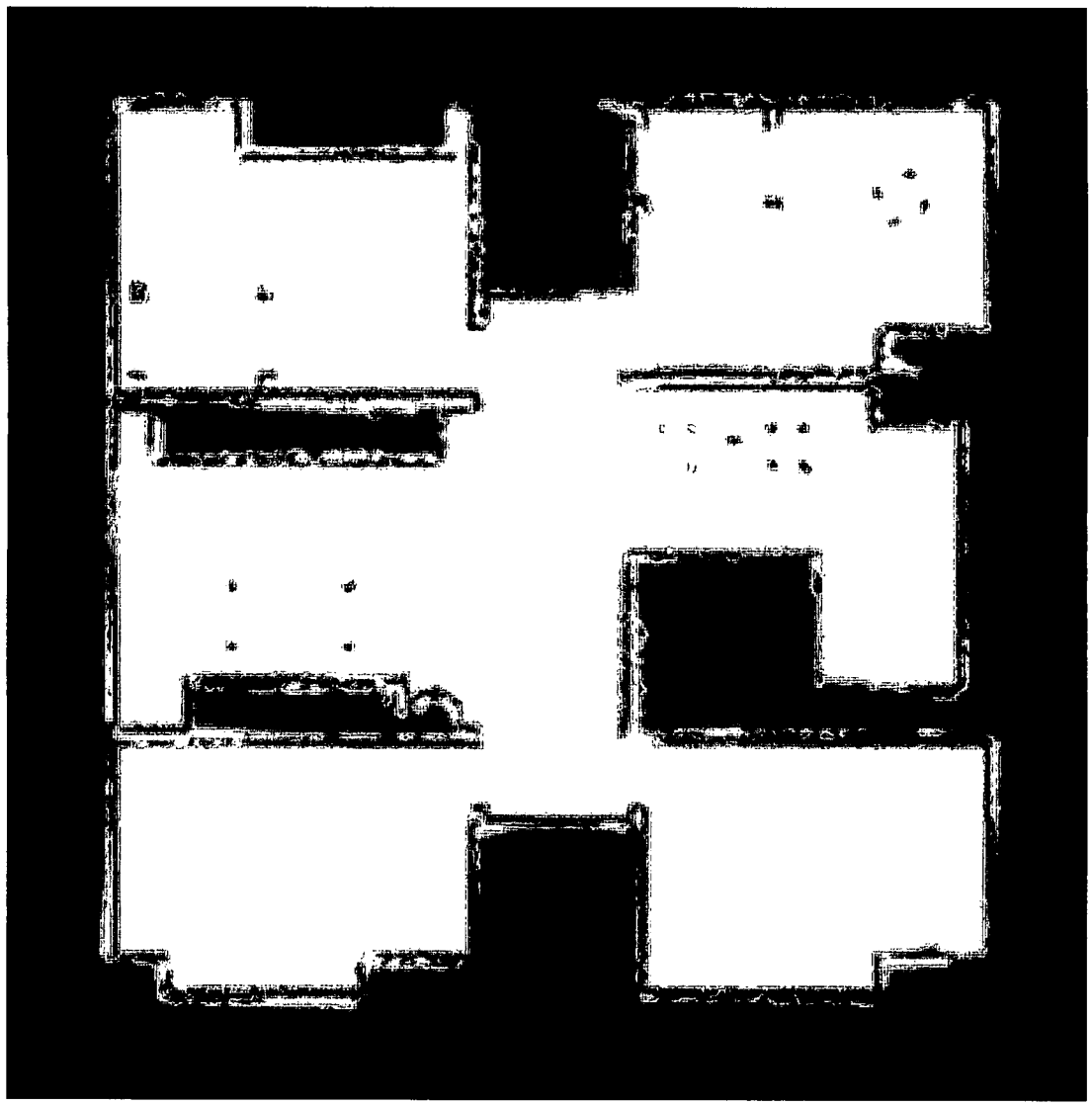
FIG. 4B is a grid map including free space and an obstacle according to an embodiment of the present invention.

FIG. 4A is an occupancy grid map according to an embodiment of the present invention and FIG. 4B is a grid map including only free space and obstacles according to an embodiment of the present invention.

For example, as shown in FIG. 4A, a grid map for the inside of an apartment is obtained. First, a mobile robot travels by self-remote in an intended area. The mobile robot can sense obstacles in the front area with a detecting sensor, such as an ultrasonic sensor, an infrared sensor, or a laser sensor, for example, which can sense a distance. Grid points comprising a plurality of points are obtained by sensing distances from the robot to structures or obstacles and an occupancy grid map may be built using those grid points. However, according to an embodiment of the present invention, distribution of the points in the occupancy grid map not only comprises 0 or 1, but probabilities between 0 and 1.

According to an embodiment of the present invention, a grid map comprising only free space and obstacles is obtained as shown in FIG. 4B, by applying a predetermined critical value to the probability distribution between 0 and 1 that are given to all the points in the space of the occupancy grid map in operation 220.

As for applying the critical value, when a critical value of 0.5 is applied to points that are given values between 0 and 1, grid points above 0.5 are given a value of 1 and other points below 0.5 are given a value of 0. Accordingly, the points for 1 appear as obstacles and for 0 appear as free space. Therefore, the grid map obtained by applying the critical value, as shown in FIG. 4B, can make an occupancy grid map relatively clear. Therefore, because probabilistically distributed grid points are changed into 1 of "existence" or 0 of "non-existence", free space and obstacles are clearly separated in a corrected grid map. However, the critical value is modified in a variety of ways by those skilled in the art in consideration of errors by the sensor.

Figure 5A:
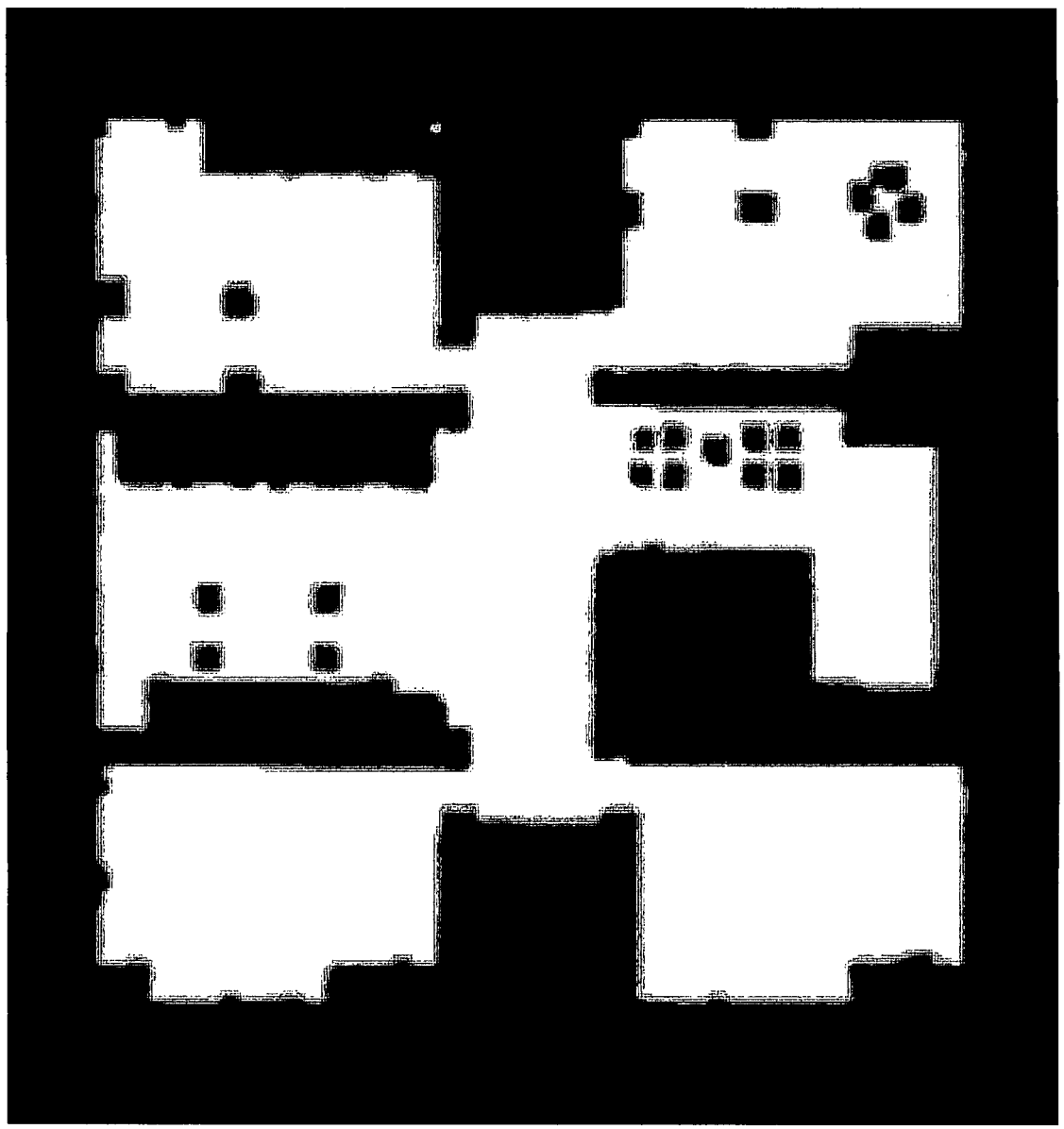
FIG. 5A is the grid map of FIG. 4B aftering undergoing erosion according to an embodiment of the present invention.
Figure 5B:
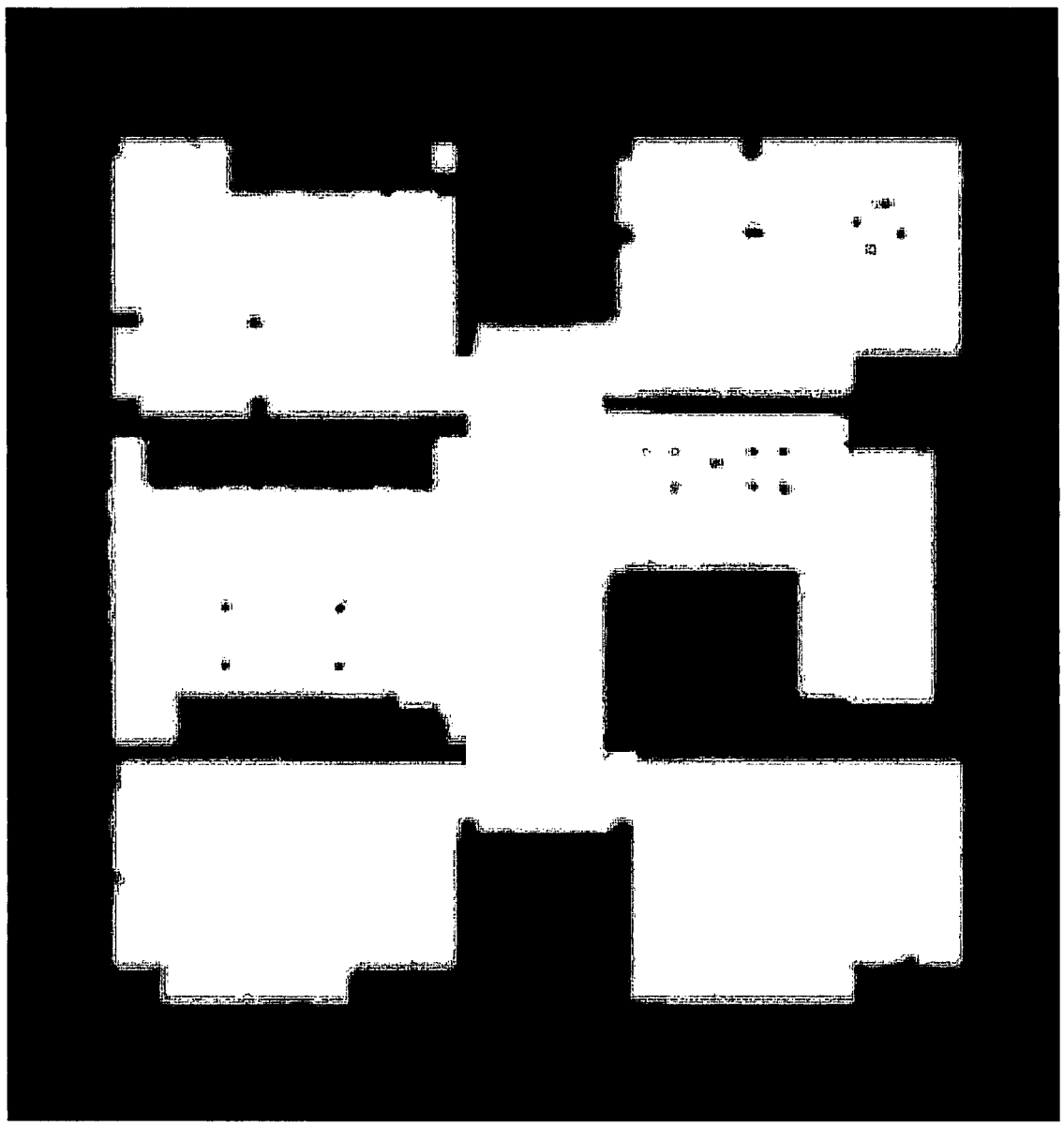
FIG. 5B is a view in which noises are removed by applying dilation to the grid map of FIG. 5A, according to an embodiment of the present invention.

FIG. 5A illustrates the grid map of FIG. 4B after undergoing erosion, and FIG. 5B illustrates a view in which noises are removed by applying dilation to the grid map of FIG. 5A according to an embodiment of the present invention.

After obtaining the grid map comprising obstacles and free space, an image processing operation is applied to the grid map to remove noises in the free space in operation 230. According to an embodiment of the present invention, the image processing operation is applied by erosion and dilation.

The erosion and dilation remove noises in the free space and is applied in any order. When erosion is applied first, the free space is reduced by thickening grid points for obstacles and walls having a predetermined size. For example, as shown in FIG. 5A, when erosion is applied to the grid map of FIG. 4B, each obstacle increases in thickness and width by predetermined sizes. In FIG. 5, the white area represents the free space and the black area represents the obstacle.

Dilation reduces grid points for obstacles and walls in size and thickness by predetermined sizes, so that free space expands as much as the obstacles reduce. For example, as shown in FIG. 5B, a grid map including only a noise-removed free space and obstacles may be obtained by applying the dilation for the grid map, which has undergone the erosion of FIG. 5A so as to expand the free space.

Alternatively, according to an embodiment of the present invention, the erosion follows the dilation. Similar to the above operation, points or small areas in the free space is considered as noises and removed.

Figure 6:
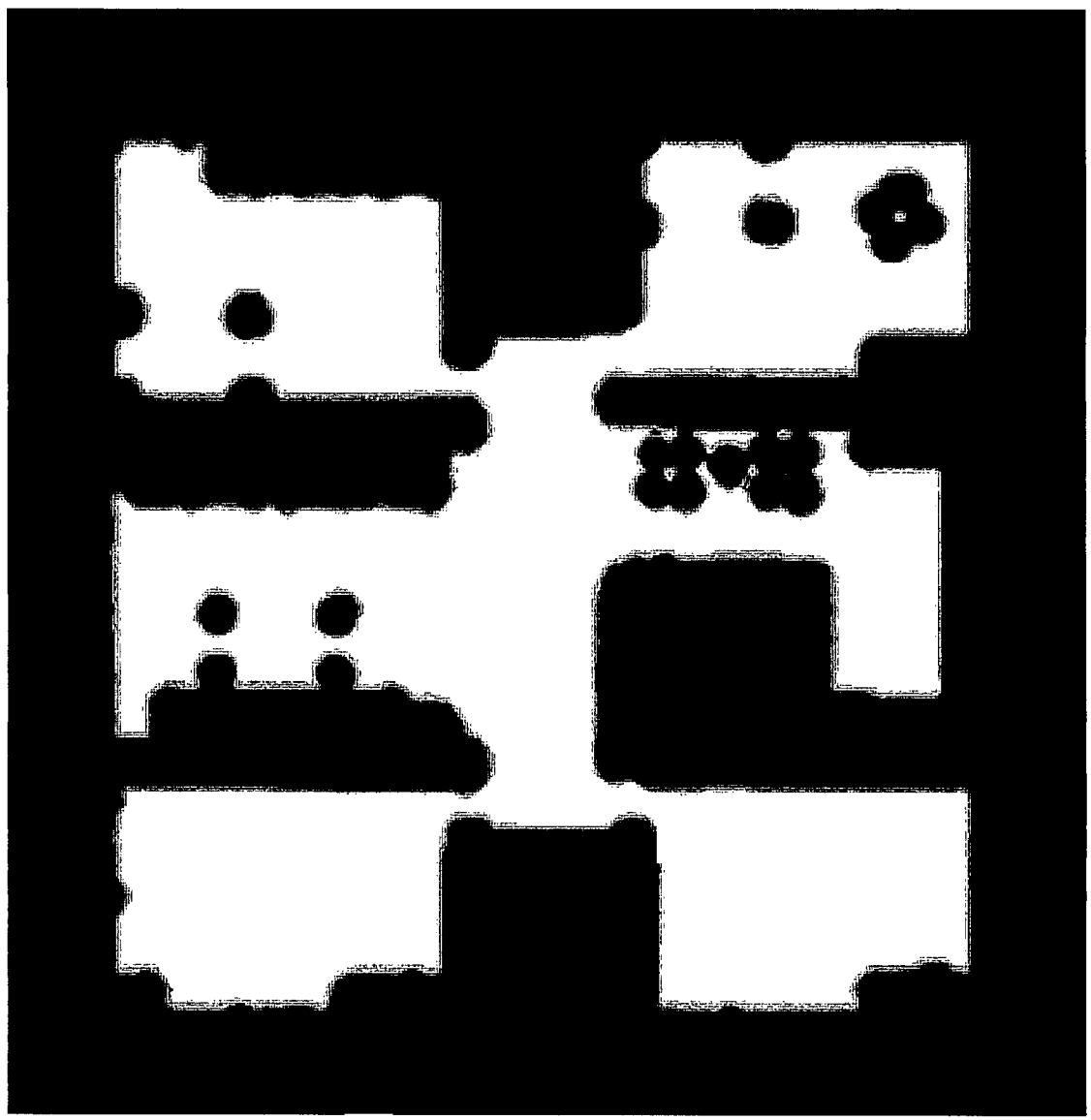
FIG. 6 is a configuration space map produced through erosion according to an embodiment of the present invention.

As described above, according to an embodiment of the present invention, noises in the free space are removed by an image process of erosion and dilation. A configuration space map is obtained by erosion as shown in FIG. 6, for example, considering the size of the robot for the noise-removed grid map in operation 240. The size and location of obstacles is estimated from the noise-removed grid map, which undergoes erosion again to reduce the amount of free space by increasing the thickness and area of the obstacles and walls. Accordingly, when an area is divided, the robot is reduced into a point size and a configuration space map is obtained without problems in respect to the size of the robot in operation 240.

Dividing an area is performed by using the obtained configuration space map. According to an embodiment of the present invention, the whole area is swept in a predetermined direction to divide an area. A means for sweeping which provides free space segments need not be a line, but rather a band-typed slice according to an embodiment of the present invention. Accordingly, unnecessary small areas, which are defined as the walls and obstacles by critical points, are reduced by dividing the free space with the band-typed slice.

The sweep direction is determined before the sweeping is applied by the band-typed slice in operation 250. An angle of the most frequent lines throughout the whole area may be obtained using a variety of ways for the area of the configuration space map. For example, in order to obtain the angle, at least one line in the area is detected and classified into a group of the same angles, and then an angle of the group comprising of the majority of lines is determined as the angle of sweep line. In order to achieve the above operation of obtaining the angle, Hough Transform, Radon Transform, or Histogram Method may be performed. According to Hough Transform, Radon Transform, or Histogram Method, a line or outer line is obtained from a parameter space by converting two-dimensional data lines into the parameter space. The sweep angle is determined by the majority of lines of the detected lines.

The obtained sweep angle is used as a sweep angle of the band-typed slice in the area of the configuration space map. The sweep direction of the band-typed slice is perpendicular to the obtained sweep angle.

Figure 7B:
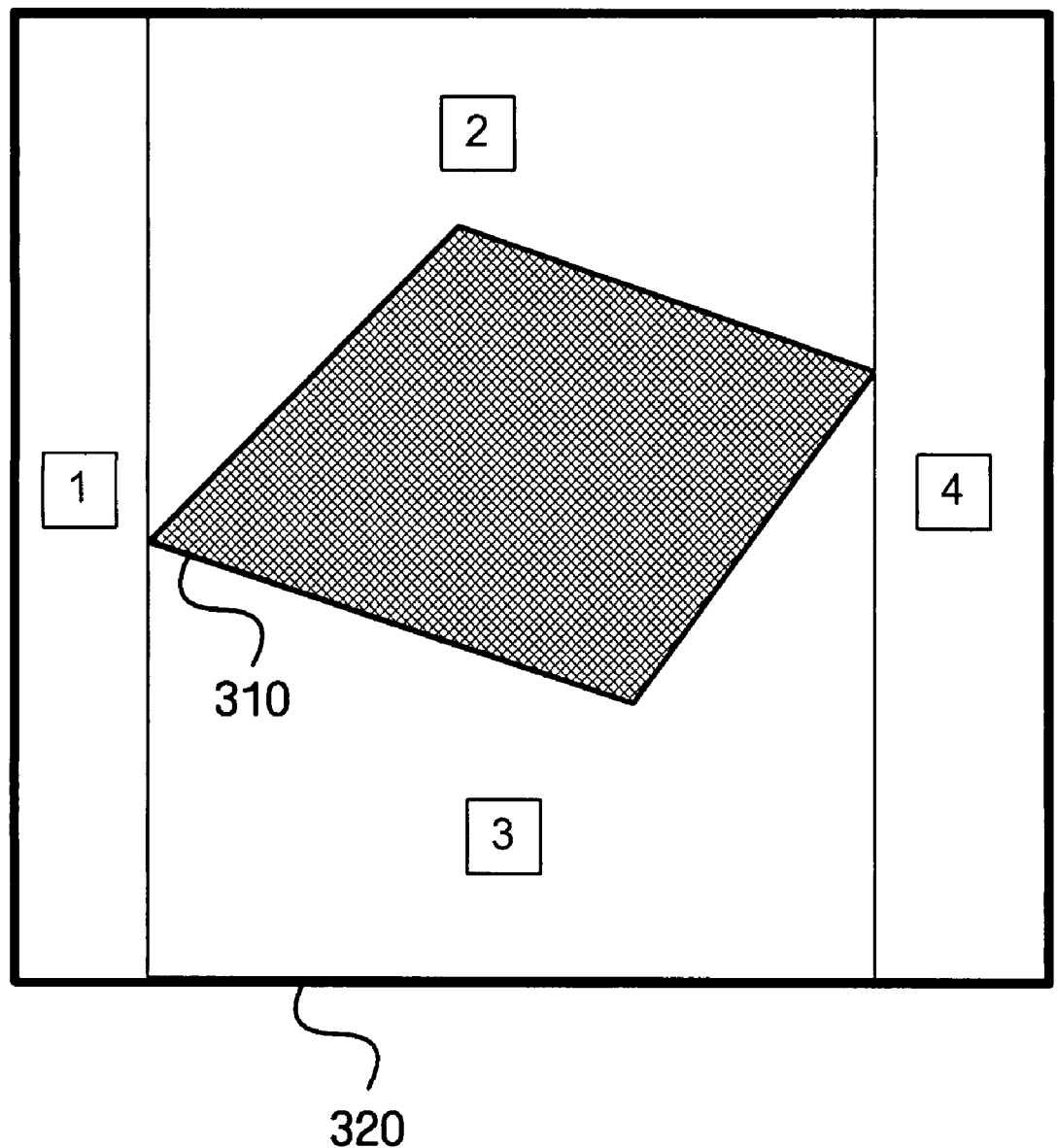
FIG. 7B is a view illustrating a result from dividing the area by applying the band-typed slice according to an embodiment of the present invention.

FIG. 7A is a view illustrating a process of applying a band-typed slice to the configuration space map according to an embodiment of the present invention, and FIG. 7B is a view illustrating a result from dividing the area by applying the band-typed slice according to an embodiment of the present invention.

After the sweep direction is determined, the area is divided by applying the band-typed slice to the configuration space map in operation 260. As the band-typed slice moves in the sweep direction, free space segments is obtained. For example, as shown in FIG. 7A, in the configuration space map, providing that the sweep angle of the band-typed slice is approximately 90 degree and the sweep direction is the right (i.e. 0 degree), an ID is given for each free space segment as the band-typed slice move. In addition, when a band-typed slice meets an obstacle in the free space, the segments of the free space may be divided.

As shown in FIG. 7A, as the band-type slice sweeps right, free space segments 700 are formed, and when the free space segments 700 are adjacent to each other without interruption of an obstacle, the free space segments are assigned an ID as one segment. That is, two free space segments at the left of FIG. 7A are considered as one area by identifying as an "ID 1".

On the contrary, according to an embodiment of the present invention, when a free space segment is divided into two segments 710, 720 by an obstacle, an ID is given to each free space segment. For example, in FIG. 7A, when a free space segment is divided into two segments by an obstacle, the upper segment 710 is assigned an "ID 2" and the lower segment 720 is assigned an "ID 3".

Accordingly, free space segments are obtained by sweeping the configuration space map with the band-type slice and IDs are given to the free space segments, which results in dividing an area as shown in FIG. 7B.

Figure 1:
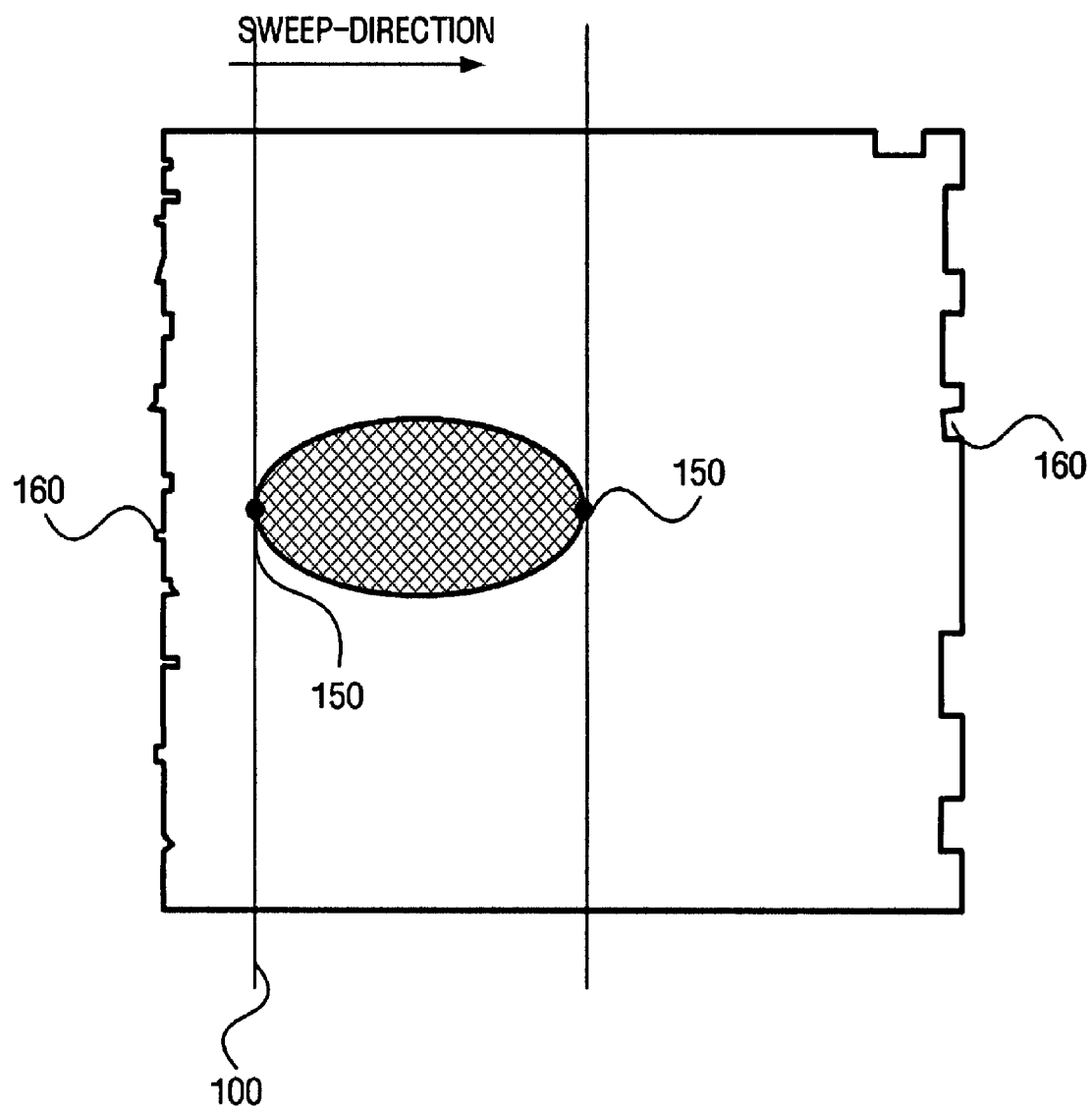
FIG. 1 is a view schematically illustrating a conventional method of dividing an area.

In the above dividing of an area, as shown in FIG. 7B, when the walls 320 or the obstacles 310 are smooth in the configuration space map, the above sweeping is not different from the conventional sweeping with lines. However, as shown in FIG. 1, when the outline of a wall or an obstacle is not smooth in the obtained configuration space map due to errors by the sensor, several unnecessary critical points 160 appears, which results in defining several small areas around the wall or the obstacle. Adverse effects by the unnecessary critical points at the wall or the obstacle, however, can be prevented by sweeping the configuration space map with the band-typed slice according to an embodiment of the present invention.

Figure 8:
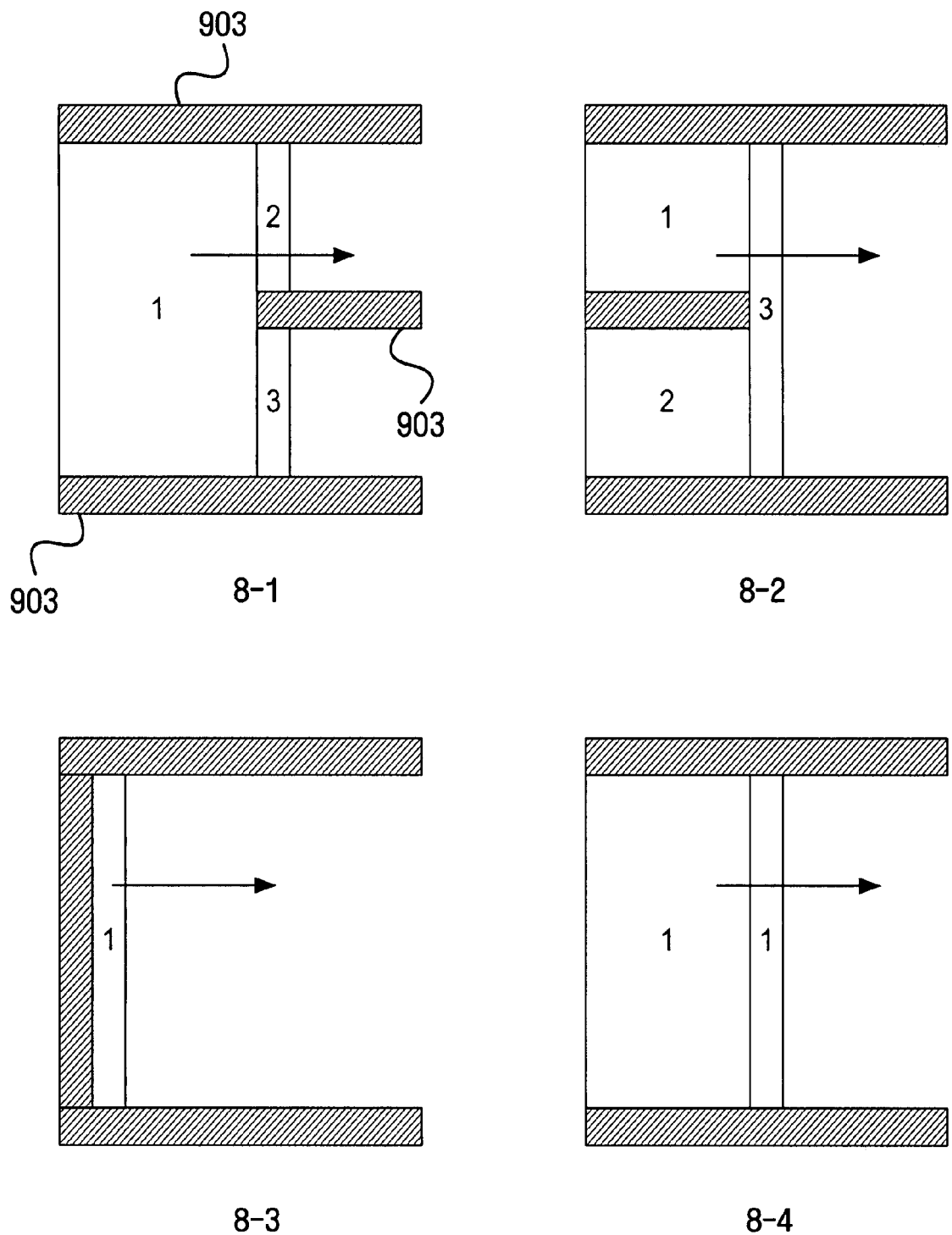
FIG. 8 illustrates four examples for giving an ID using the band-typed slice according to an embodiment of the present invention.
Figure 9:
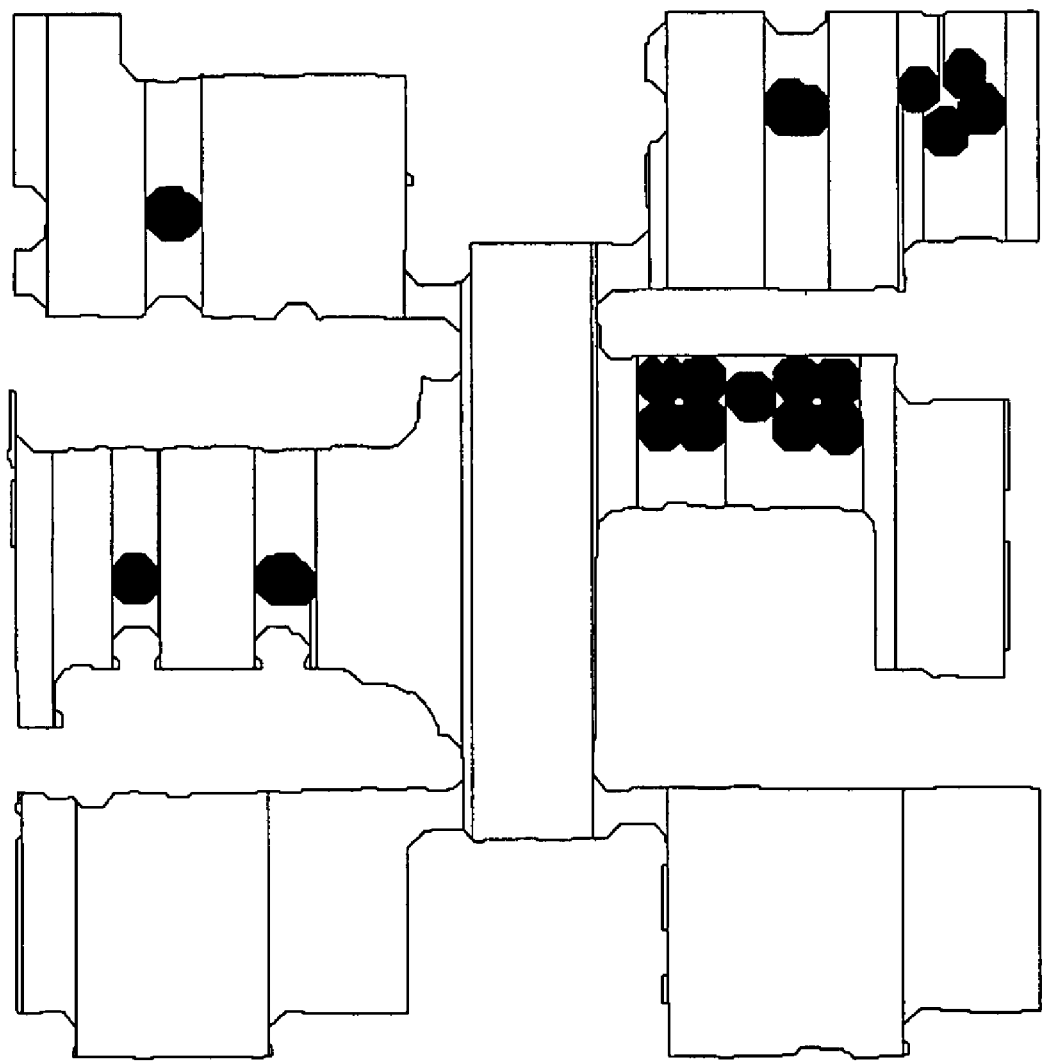
FIG. 9 shows a result of dividing an area using the band-typed slice for the configuration space map that is produced according to an embodiment of the present invention as shown in FIG. 6.

FIG. 8 illustrates four examples for giving an ID using the band-typed slice according to an embodiment of the present invention, and FIG. 9 illustrates a result of dividing an area using the band-typed slice for the configuration space map that is produced according to an embodiment of the present invention in FIG. 6.

As shown in FIG. 8, the assigning of an ID to a free space segment is determined in different ways, for example, as follows.

According to an embodiment of the present invention, at least two free space segments are adjacent to a preceding common free space segment. For example, as shown in FIG. 8-1, when two free space segments are adjacent to a common free space segment that is assigned an "ID 1", a new ID is given to each free space segment. Accordingly, "ID 2" is assigned to a free space segment and "ID 3" is given to the other.

According to an embodiment of the present invention, a free space segment is adjacent to a plurality of preceding free space segments. For example, as shown in FIG. 8-2, a new free space segment is adjacent to upper and lower free space segments that are assigned an "ID 1" and an "ID 2", respectively. In this configuration, a new ID may be given to the new free space segment. Accordingly, the new free space segment is assigned an "ID 3".

According to an embodiment of the present invention, a free space segment is adjacent to an obstacle or a wall 903 only. In this configuration, when starting the sweeping by a slice, a new ID is given to the free space segment. For example, as shown in FIG. 8-3, a new "ID 1" is given.

According to an embodiment of the present invention, a free space segment is adjacent to a preceding free space segment. In other words, two free space segments are adjacent one to one. The following free space segment is given to the preceding ID. For example, as shown in FIG. 8-4, the following free space segment is given the preceding "ID 1".

An area may be divided in accordance with one of the above embodiments, which assigns an ID to a free space segment. For example, when an area in the configuration space map is divided according to one of the above embodiments, the area is initially assigned an "ID 1" according to the first and third cases while sweeping is processed. While the area keeps swept, a free space segment is divided into two of upper and lower segments such as the first case by an obstacle. Accordingly, an "ID 2" is given to the upper segment of space and an "ID 3" is given to the lower free space segment. The sweeping corresponds to the second case at the end of the obstacle. Accordingly, a new "ID 4" is given to the other free space segment.

After an ID is given, a following free space segment is formed by the band-type slice. When the following free space segment is adjacent to the preceding free space segment one to one, a new ID is not given to the following segment as described above. Therefore, in the free space of FIG. 7A, after each ID is given; therefore a new ID is not given in sweeping by the slice before the slice meets another obstacle or the obstacle disappears. Accordingly, as shown in FIG. 7B, IDs of 1-4 are assigned and the free space is divided into four areas.

FIG. 9 illustrates a view of areas that are divided by applying the above dividing method using sweeping by the band-typed slice to a typical apartment. The above dividing is made using the configuration space map of FIG. 6. A sweeping angle is determined by finding the most direction in the produced configuration space map. For example, the sweeping angle is determined as approximately 90 degree, the sweep-direction is the right and the free space may be divided into several segments.

It is possible to reduce the instances when several divided segments appear at the boundary of a wall or an obstacle by using the band-typed slice. As shown in FIG. 9, the segment at the left and right ends is not divided into several segments, but just into one or two segments, and it is possible to reduce the instances when an area is divided into several segments by noises at the boundary of a wall or an obstacle. However, small segments may be defined at a wall or a corner depending on the slice width.

Figure 10:
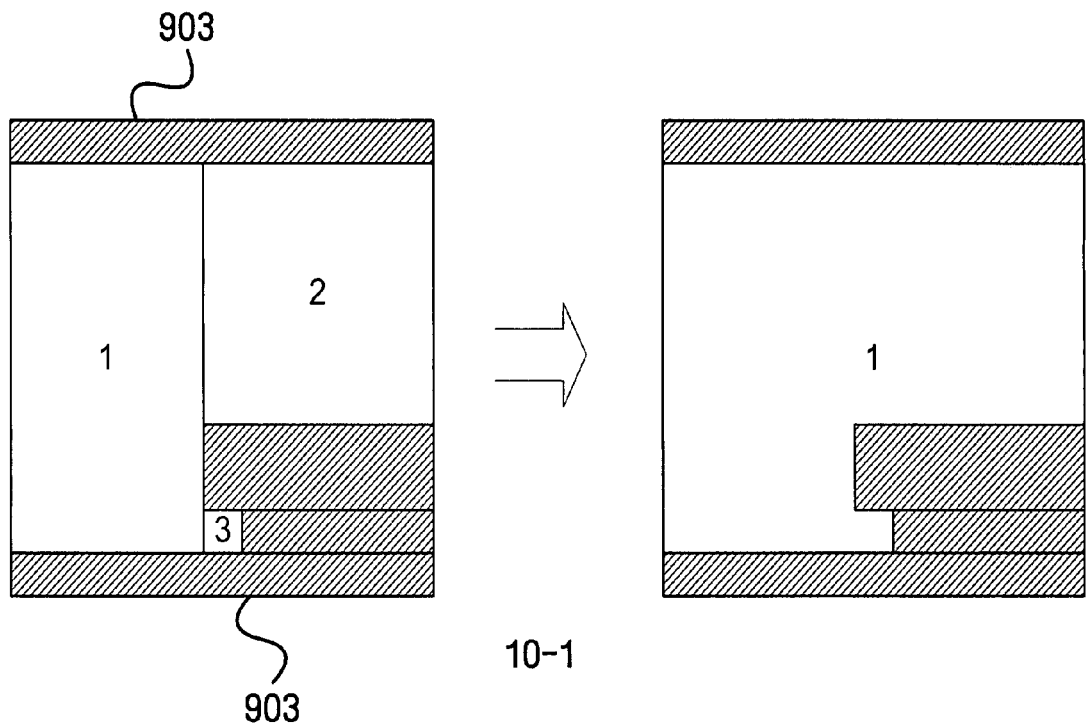
FIG. 10 is a view illustrating a process of removing a noise cell and combining segments according to an embodiment of the present invention.
Figure 10:
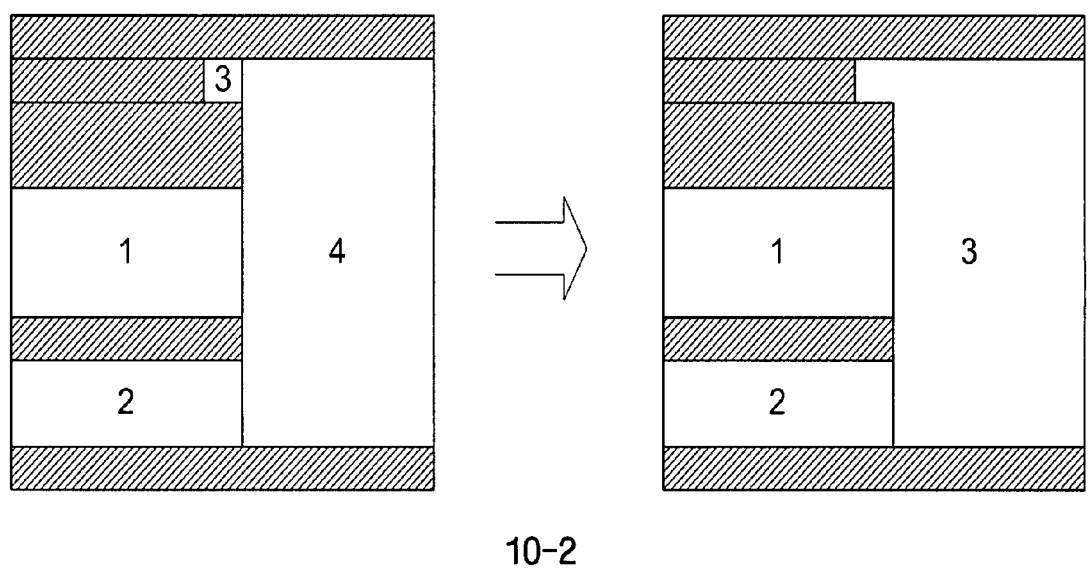
Figure 11:
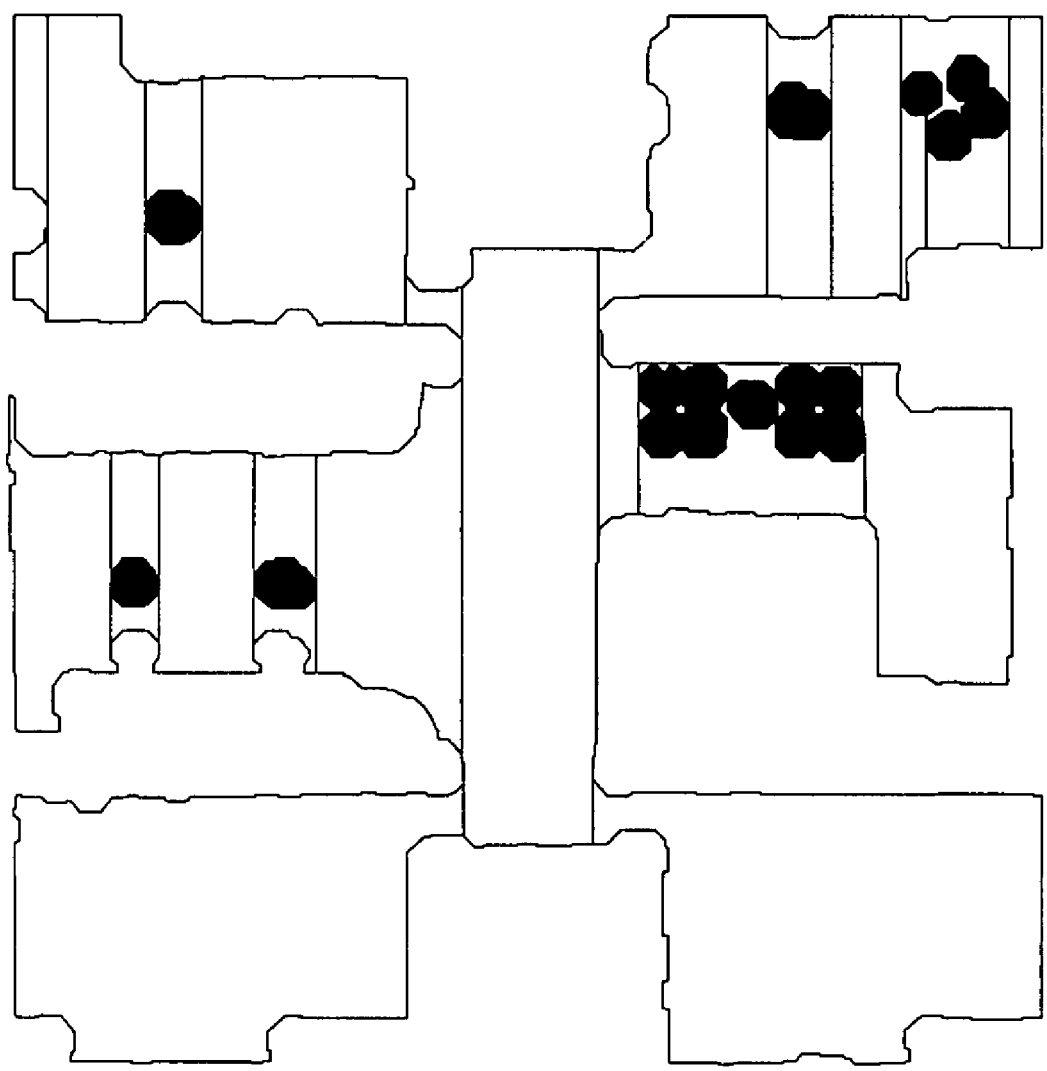
FIG. 11 is a view of the configuration space map of FIG. 9 where a noise cell is removed and segments are combined according to an embodiment of the present invention.

FIG. 10 is a view illustrating removing noise cells and combining segments, and FIG. 11 is a view illllustrating the result of removing noise cells and the combining areas.

After the division by sweeping using the slice, cell noises are removed in operation 270, and segments are combined at the same time in operation 280.

When a wall is uneven or a part of wall protrudes due to a pillar, for example, several segments may be defined even though the slice is used to divide an area. For example, when free space segments are defined as shown in the left view of FIG. 10-1, the segment assigned an "ID 3" may be too small to be accepted as a segment, such that it may be combined with a preceding segment by regarding it as a noise cell.

A cell that is under a predetermined critical value in the width or size is considered as a noise cell. A cell considered as a noise cell may be combined with an adjacent another segment in operation 270. It is examined that the dividing is correct resulting from removing the noise cell accordingly, and when a separated portion appears due to the noise cell, the portion is combined in operation 280.

As shown in FIG. 10-1, when two segments adjacent to each other or only one segment except for a noise cell is defined, there can be one segment if the noise cell is removed. Accordingly, the whole area is defined as one area by combining noise cells. In FIG. 10, because the whole area is divided into two segments other than a noise cell resulting from combining the noise cell, the two segments are finally combined.

On the other hand, when three or more segments are defined with the exception of the noise cell, even though the noise cell is not defined, three segments remain. Therefore, only the noise cell can be combined. As shown in FIG. 10-2, even though a noise cell is combined with its adjacent segment, three segments still remain, thus the area cannot be combined.

A view of FIG. 11 is obtained by applying the result obtained in FIG. 9 to the above removing and combining of a cell noise. Referring to FIG. 11, an area is divided by the band-typed slice and noise cells having small width or size exist in the area. The total number of segments can be reduced by combining the noise cells according to the above removing of noise and the combining of the other segments. Accordingly, a plurality of segments is recognized as one wide area by removing and combining the noise cells, which allows a robot to effectively work in one area.

Figure 12A:
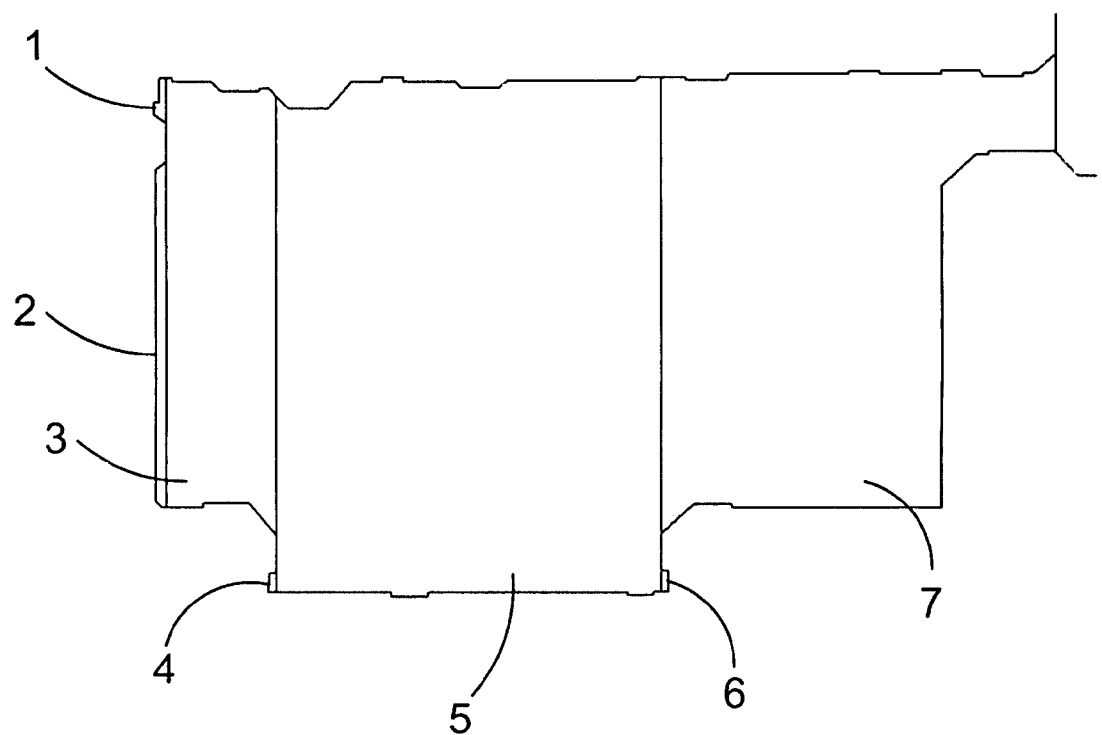
FIG. 12A is an expanded view of the lower left side of the result of the division of FIG. 9, according to an embodiment of the present invention.
Figure 12B:
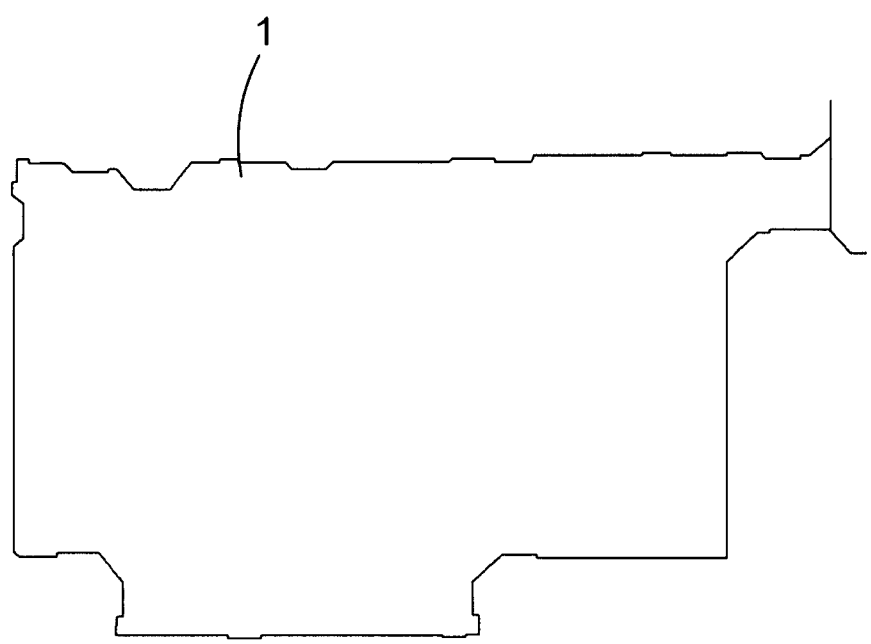
FIG. 12B is an expanded view of the lower left side of the result of the combination of FIG. 11 according to an embodiment of the present invention.

FIGS. 12A and 12B are an expanded view of each lower left portion of the views of FIGS. 9 and 11, respectively.

In FIG. 12A is a view illustrating the result of dividing an area with the band-typed slice and the area is relatively effectively divided, but the area may be divided into smaller segments by noise cells at segments 1-7.

As shown in FIG. 12B, the segments 1-7 are combined as one area (1) by combining the noise cells 1, 4, and 6 with adjacent segments in operation 270 and thereafter combining them in operation 280.

For example, as for a cleaning robot, as shown in FIG. 12B, the robot divides an area of a room without an obstacle by sweeping with a slice and thereafter can reduce the divided segments by removing cell noises and combining the segments at the same time. As a result, when the cleaning robot individually cleans the divided segments in the room, the segments to clean are reduced, thus the robot can effectively clean the room.

Figure 13:
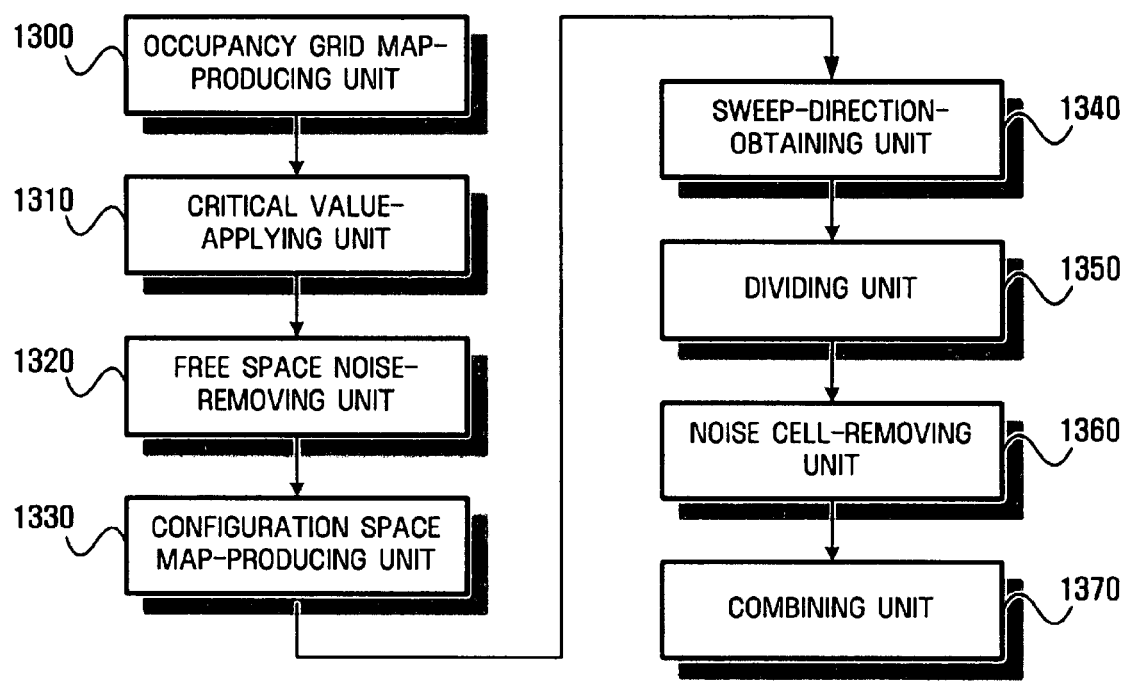
FIG. 13 is a block diagram illustrating a device of dividing a coverage area for a robot according to an embodiment of the present invention.

FIG. 13 is a block diagram illustrating a device of dividing a coverage area for a robot according to an embodiment of the present invention.

The dividing device according to an embodiment of the present invention comprises an occupancy grid map-producing unit 1300, a critical value-applying unit 1310, a free space noise-removing unit 1320, a configuration space map-producing unit 1330, a sweep direction-obtaining unit 1340, a dividing unit 1350, a noisecell-removing unit 1360, and a combining unit 1370.

The occupancy grid map-producing unit 1300 allows a robot to make a grid map for an area to work while traveling by self-remote. Several grid points may be obtained by the occupancy grid map-producing unit and they are probability grid points represented by a probability value between 0 and 1.

The critical value-applying unit 1310 converts the probability values for the probability grid points into 0 or 1 after applying a critical value to the probability values and comparing them with the critical values. Grid points that are represented by 1 are the portions where a wall or an obstacle occupies and the other grid points compose free space.

The free space noise-removing unit 1320 removes noises in free space through erosion and dilation. Accordingly, a map comprising free space and obstacles can be obtained by removing noises by erosion and dilation, or dilation and erosion.

The configuration space map-producing unit 1330 makes configuration space map using erosion. The erosion reduces free space by making walls or obstacles thick in consideration of the size of a robot. Accordingly, a robot may be considered as a point using the produced configuration space map and divide free space.

The sweep-direction-obtaining unit 1340 finds the most frequent line group in the produced configuration space map and obtains a sweeping angle from the line group. In order to search lines in the configuration space map, Hough Transform, Radon Transform, or a Histogram Method may be performed.

The dividing unit 1350 divides an area by sweeping the obtained configuration space map in a sweep direction. Unnecessary dividing around walls or obstacles due to errors by a sensor may be reduced by sweeping the configuration space map with a band-typed slice. The dividing unit effectively divides an area by giving an ID for free space segments.

The noise cell-removing unit 1360 determines segments having smaller width or segments than predetermined values in segments divided by the dividing unit as noises, and removes them. When a segment is determined as a noise cell, it may be combined with an adjacent segment.

The combining unit 1370 examines that the dividing is correct after combining noise cells and then combining incorrectly divided segments. The combining unit examines that segments divided by a noise cell exist and combines them into a segment. When a plurality of noise cells are defined due to uneven surface and several segments are defined accordingly, the combining unit removes noise cells and tries to combine the several segments. Therefore, it prevents noise cells from dividing segments and allows a robot to effectively work.

According to an embodiment of the present invention, it is possible to reduce several segments around walls or obstacles due to errors in sensing the walls or obstacles by dividing an area with a band-typed slice.

According to an embodiment of the present invention, an area can be divided regardless of the robot's size by producing a configuration space map.

According to an embodiment of the present invention, a robot can effectively work by combining noise cells that are a plurality of small segments defined in dividing.

According to an embodiment of the present invention, an area can be divided into segments where a robot can practically work by removing noise cells and combining the divided segments.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of dividing a coverage area of a robot, the method comprising:
   producing an occupancy grid map comprising grid points that are probabilistically distributed by sensing a distance from an obstacle;
   producing a configuration space map by increasing a thickness of an obstacle and a wall in the occupancy grid map based on a radius and a size of the robot; and
   dividing an area by sweeping the area with a band-typed slice in one direction in the configuration space map.

2. The method of claim 1, wherein the producing of an occupancy grid map comprises sensing the distance using a distance measuring sensor.

3. The method of claim 1, further comprising: producing a grid map which is divided into free space or an obstacle region from the occupancy grid map by applying a critical value.

4. The method of claim 1, further comprising: removing free space noise from the grid map which is divided into free space or an obstacle region.

5. The method of claim 4, wherein the removing of the free space noise is performed by erosion which increases the thickness of the obstacle and the wall to a predetermined size, and by dilation which increases the free space noise and decreases the thickness of the obstacle and the wall to a predetermined size.

6. The method of claim 1, wherein the producing of a configuration space map comprises producing the configuration space map by erosion which increases the thickness of an obstacle and a wall up to the radius of the robot.

7. The method of claim 1, further comprising: obtaining a sweep-direction of the band-typed slice which is perpendicular to a direction of a majority of lines in the configuration space map.

8. The method of claim 7, wherein the obtaining of the sweep-direction comprises obtaining the sweep-direction of the band-typed slice which is perpendicular to the direction the majority of lines in the configuration space map, using at least one of Hough Transform, Radon Transform, and Histogram Method.

9. The method of claim 1, further comprising: combining a noise cell of which a width or an area is smaller than a predetermined size into an adjacent segment.

10. The method of claim 9, further comprising: combining two adjacent segments after the combining of a noise cell.

11. A device for dividing a coverage area of a robot, the device comprising:
    an occupancy grid map-producing unit to produce an occupancy grid map comprising grid points that are probabilistically distributed by sensing a distance from an obstacle;
    a configuration space map-producing unit to produce a configuration space map by increasing a thickness of an obstacle and a wall in the occupancy grid map based on a radius and a size of the robot; and
    a dividing unit to divide an area by sweeping the area in a predetermined direction with a band-typed slice in the configuration space map.

12. The device of claim 11, wherein the occupancy grid map-producing unit senses the distance using a distance measuring sensor.

13. The device of claim 12, wherein the distance measuring sensor is at least one of a ultrasonic wave sensor, an infrared sensor and a laser sensor.

14. The device of claim 11, further comprising: a critical value-applying unit to produce a grid map which is divided into free space or an obstacle region from the occupancy grid map by applying a critical value.

15. The device of claim 14, further comprising: a free space noise-removing unit to remove a free space noise from the grid map which is divided into free space and an obstacle region.

16. The device of claim 15, wherein the free space noise-removing unit performs erosion which removes the free-space noise and increases the thickness of an obstacle and a wall to a predetermined size, and performs dilation which increases the free space noise and decreases the thickness of an obstacle and a wall to a predetermined size.

17. The device of claim 11, wherein the configuration space map-producing unit produces the configuration space map by erosion which increases the thickness of an obstacle and a wall up to the radius of the robot.

18. The device of claim 11, further comprising: a sweep-direction-obtaining unit to obtain a sweep-direction of the band-typed slice which is perpendicular to a direction of a majority of lines in the configuration space map.

19. The device of claim 18, the sweep-direction-obtaining unit obtains the sweep-direction of the band-typed slice which is perpendicular to the direction of the majority of lines in the configuration space map using at least one of Hough Transform, Radon Transform, and Histogram Method.

20. The device of claim 11, further comprising: a noise cell-removing unit combining a noise cell of which a width or an area is smaller than a predetermined size into an adjacent segment.

21. The device of claim 20, further comprising: a combining unit combining two adjacent segments after the combining of the noise cell.

* * * * *